(12) United States Patent
Sheriff (10) Patent No.: US 7,585,095 B1
(45) Date of Patent: Sep. 8, 2009

(54) ILLUMINATED MOTORCYCLE SAFETY AND VANITY LIGHT BAR

(76) Inventor: Robert E. Sheriff, 2230 Pope Rd., Villa Rica, GA (US) 30180

( * ) Notice: Subject to any disclaimer, the term of this patent is extended or adjusted under 35 U.S.C. 154(b) by 0 days.

(21) Appl. No.: 12/198,870

(22) Filed: Aug. 26, 2008

(51) Int. Cl.
*F21V 33/00* (2006.01)
(52) U.S. Cl. .................. 362/473; 362/476; 362/546; 362/812; 362/367
(58) Field of Classification Search ......... 362/473–476, 362/546, 97.1, 812, 367
See application file for complete search history.

(56) References Cited

U.S. PATENT DOCUMENTS

| | | | |
|---|---|---|---|
| D163,328 S * | 5/1951 | Rothman | D12/193 |
| 4,495,553 A * | 1/1985 | Haynes | 362/473 |
| 5,406,465 A | 4/1995 | Farchione | |
| D374,295 S | 10/1996 | Farchione | |
| 5,615,940 A * | 4/1997 | Barry | 362/473 |
| 5,713,653 A | 2/1998 | White et al. | |
| D397,642 S | 9/1998 | Tolefson | |
| D401,366 S | 11/1998 | McCool | |
| 5,856,779 A | 1/1999 | Friday | |
| 5,955,945 A | 9/1999 | Fuhrer | |
| 6,053,626 A | 4/2000 | Zagrodnik et al. | |
| D427,113 S | 6/2000 | Luck | |
| D448,870 S | 10/2001 | Kamata et al. | |
| 6,478,458 B2 | 11/2002 | Hickman | |
| D488,105 S | 4/2004 | Stahel et al. | |
| D491,493 S | 6/2004 | Stahel et al. | |
| D506,845 S | 6/2005 | Wernimont | |
| 7,108,407 B2 | 9/2006 | Kashiwagi | |
| 7,114,836 B2 | 10/2006 | Sheu et al. | |
| 7,306,358 B2 | 12/2007 | Treat | |
| 7,350,949 B2 | 4/2008 | Meinke et al. | |
| 2002/0105811 A1 * | 8/2002 | Hickman | 362/473 |

* cited by examiner

*Primary Examiner*—Laura Tso
(74) *Attorney, Agent, or Firm*—Crose Law LLC; Bradley D. Crose (57) ABSTRACT

The technology described herein provides an illuminated motorcycle safety and vanity light bar for conveying an illuminated identification or vanity message. The safety and vanity light bar for a motorcycle includes a light bar having an outwardly facing message surface area for illumination from an internal light source and a plurality of transparent optical apertures disposed upon the outwardly facing message surface area of the light bar. A message is displayed upon the message surface area and illuminated with illumination from the internal light source through the plurality of transparent optical apertures.

20 Claims, 7 Drawing Sheets

ILLUMINATED MOTORCYCLE SAFETY AND VANITY LIGHT BAR

FIELD OF THE INVENTION

The technology described herein relates generally to the fields of motorcycles, visual displays, and safety lights, and vanity lights. More specifically, this technology relates to an illuminated motorcycle safety and vanity light bar for conveying an illuminated message.

BACKGROUND OF THE INVENTION

Motorcycles are known to include various fixtures and structures to support tail lights, brake lights, headlights, and the like. By way of example, such structures can include light bars utilized to hold lights and contain wiring.

Related patents known in the art include the following: U.S. Pat. No. 6,053,626, issued to Zagrodnik, et al. on Apr. 25, 2000, discloses a motorcycle directional light bar. U.S. Pat. No. 6,478,458, issued to Hickman on Nov. 12, 2002, discloses an illuminated license plate housing. U.S. Pat. No. 7,114,836, issued to Sheu, et al. on Oct. 3, 2006, discloses a motorcycle tail light structure. U.S. Pat. No. 7,306,358, issued to Treat on Dec. 12, 2007, discloses a swing arm taillight assembly for a motorcycle. U.S. Pat. No. 7,108,407 issued to Kashiwagi on Sep. 19, 2006, discloses a rear fender integrated tail lamp device for a motorcycle. U.S. Pat. No. 5,856,779, issued to Friday on Jan. 5, 1999, discloses a motorcycle brake light enhancement system. U.S. Pat. No. 5,955,945, issued to Fuhrer on Sep. 21, 1999, discloses a fail safe system for providing warning signals upon the failure of motorcycle brake or tail lights. U.S. Pat. No. D506,845, issued to Wernimont on Jun. 28, 2005, discloses the ornamental design for a motorcycle tail light and license frame. U.S. Pat. No. D491,493, issued to Stahel, et al. on Jun. 15, 2004, discloses the ornamental design for a light bar for a motorcycle trunk. U.S. Pat. No. D488,105, issued to Stahel, et al. on Apr. 6, 2004, discloses the ornamental design for a portion of an accessory and trim light for a motorcycle. U.S. Pat. No. D448,870, issued to Kamata, et al. on Oct. 2, 2001, discloses the ornamental design for an exterior surface configuration of a motorcycle rear combination light assembly. U.S. Pat. No. D427,113, issued to Luck on Jun. 27, 2000, discloses the ornamental design for a motorcycle light bar. U.S. Pat. No. D401,366, issued to McCool on Nov. 17, 1998, discloses the ornamental design for a motorcycle light mounting bar. U.S. Pat. No. D397,642, issued to Treat on Dec. 11, 2007, discloses the ornamental design for a light support for the rear of a motorcycle. U.S. Pat. No. 5,713,653, issued to White, et al. on Feb. 3, 1998, discloses a motorcycle tail light. U.S. Pat. No. D374,295, issued to Farchione on Oct. 1, 1996, discloses the ornamental design for a light bar for motorcycle cargo carriers. U.S. Pat. No. 5,406,465, issued to Farchione on Apr. 11, 1995, discloses a motorcycle light bar assembly. U.S. Pat. No. 7,350,949, issued to Meinke, et al. on Apr. 1, 2008, discloses a trim component with concealed indicium.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides an illuminated motorcycle safety and vanity light bar for conveying an illuminated identification or vanity message.

In one exemplary embodiment, the technology described herein provides a safety and vanity light bar for a motorcycle. The safety and vanity light bar includes a light bar having an outwardly facing message surface area for illumination from an internal light source and transparent optical apertures disposed upon the outwardly facing message surface area of the light bar. A message is displayed upon the message surface area and illuminated with illumination from the internal light source through the plurality of transparent optical apertures. The message surface area, upon which the transparent optical apertures are disposed, can include an opaque lens. Alternatively, the message surface area can be a metal surface. The light bar is configured for placement with a tail light and directional lights on the rear of a motorcycle. The light bar can also be utilized for placement with a head light on the front of a motorcycle. The transparent optical apertures on the outwardly facing message surface area of the light bar can be raised apertures. The transparent optical apertures on the message surface area can be apertures defined by characters, numerals, or a combination of characters and numerals. The transparent optical apertures on the message surface area can include messages of public safety and identification and vanity messages. The safety and vanity light bar further includes a light bar extension slidably disposed within each end of the light bar. The light bar is slidably extensible to extend an overall width of the light bar.

In another exemplary embodiment, the technology described herein provides a lighting assembly for a motorcycle. The lighting assembly includes a light bar having an outwardly facing message surface area for illumination from within, a plurality of transparent optical apertures disposed upon the outwardly facing message surface area of the light bar, a light source internal to the light bar configured to provide illumination through the plurality of transparent optical apertures disposed upon the light bar, and a wiring harness to provide electrical connectivity to the internal light source from a battery of a motorcycle. In this embodiment, a message is displayed upon the message surface area and illuminated with illumination from the light source through the plurality of transparent optical apertures. The light source internal to the light bar can be a single lamp, a strobe lamp, or a plurality of light-emitting diodes (LEDs). The lamps can be set to blink. The wiring harness and the light source are concealed within the light bar. The lighting assembly also includes a light bar extension slidably disposed within each end of the light bar, wherein the light bar is slidably extensible to extend an overall width of the light bar.

In yet another exemplary embodiment, the technology described herein provides a motorcycle. The motorcycle includes a motorcycle frame having a rear and a front, a light bar disposed upon the motorcycle frame, the light bar having an outwardly facing message surface area for illumination from an internal light source, and a plurality of transparent optical apertures disposed upon the outwardly facing message surface area of the light bar. In this embodiment, a message is displayed upon the message surface area of the motorcycle light bar and illuminated with illumination from the internal light source through the plurality of transparent optical apertures. The message is displayed on the rear of the motorcycle. Alternatively, the message is displayed on the front of the motorcycle.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides an illuminated motorcycle safety and vanity light bar for conveying an illuminated identification or vanity message.

Figure 1:
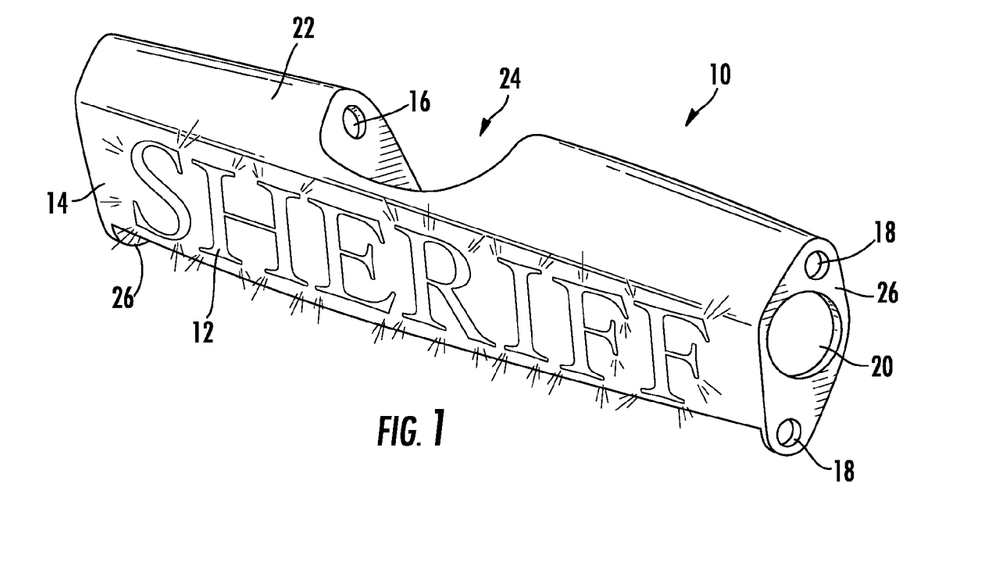
FIG. 1 is a front perspective view of a motorcycle safety and vanity light bar, illustrating, in particular, an illuminated identification and safety message according to an embodiment of the technology.

Referring now to FIG. 1, a front perspective view of a motorcycle safety and vanity light bar 10 is shown. The motorcycle safety and vanity light bar 10 includes a light bar having a top surface 22 and an outwardly facing message surface area 14 for illumination from an internal light source. Disposed within the outwardly facing message surface area 14 of the light bar 10 is a plurality of transparent optical apertures 12. By way of example, the transparent optical apertures 12 can be cut-outs within the message surface area 14, wherein the cut-outs are covered by a colored and/or patterned filter. The transparent optical apertures 12 can be cut by plasma, laser, or water jet cutting processes or other known commercial process. The transparent optical apertures 12 can be left open or covered with a colored and/or patterned filter. A message is displayed upon the message surface area 14 and illuminated with illumination from the internal light source through the plurality of transparent optical apertures 12. The internal light source can be blinked. By way of example, the message shown in FIG. 1 in the plurality of transparent optical apertures 12 is an illuminated "SHERIFF" to visually indicate to those within sight distance that the motorcycle is one of law enforcement.

The message surface area 14, upon which the transparent optical apertures 12 are disposed, can include an opaque lens to block passage of light except through the apertures. Alternatively, the message surface area 14 can be a metal surface to block passage of light except through the apertures. By way of example, the motorcycle safety and vanity light bar 10 can be aluminum or chromed aluminum. The transparent optical apertures 12 can include a filter (not shown) for color and/or pattern. The color and/or pattern of the transparent optical apertures 12 can vary from the color and/or pattern of the message surface area 14. The transparent optical apertures 12 on the message surface area 14 can be apertures defined by characters, numerals, or a combination of characters and numerals. Additionally, the apertures can define symbols. The transparent optical apertures 12 on the message surface area 14 can include both messages of public safety and identification and vanity messages. Public safety messages can include, for example, SHERIFF, POLICE, SECURITY, and the like to visually indicate to those within sight distance that the motorcycle is one of law enforcement. Vanity messages can include, for example, creative names, symbols, numbers, names, or the like, such as HOT ROD, C U N SD, BRN2RD, etc. as chosen by the motorcycle owner or rider.

The motorcycle safety and vanity light bar 10 includes one or more central mounting hole 16. By way of example, the one or more central mounting hole 16 is utilized to secure the motorcycle safety and vanity light bar 10 to the rear fender of a motorcycle under a central tail light and brake light or to the front frame of a motorcycle under a head light assembly. For example, a portion of a rear fender or front frame fits in recess 24 of the motorcycle safety and vanity light bar 10 and screws, bolts, or the like are utilized to hold the motorcycle safety and vanity light bar 10 securely in place.

The motorcycle safety and vanity light bar 10 includes end connectivity points 26 disposed upon each end. The end connectivity points 26 are utilized for mechanical and electrical connectivity to turn signal directional lights, for example.

Holes 18 are provided such that signal lights, or the like, can be screwed, bolted, or otherwise attached to the motorcycle safety and vanity light bar 10. Hole 20 provides a passageway for electrical wires connecting lamps and wiring harnesses to the motorcycle electrical circuit (not shown) for operative and selective illumination by the rider.

Figure 2:
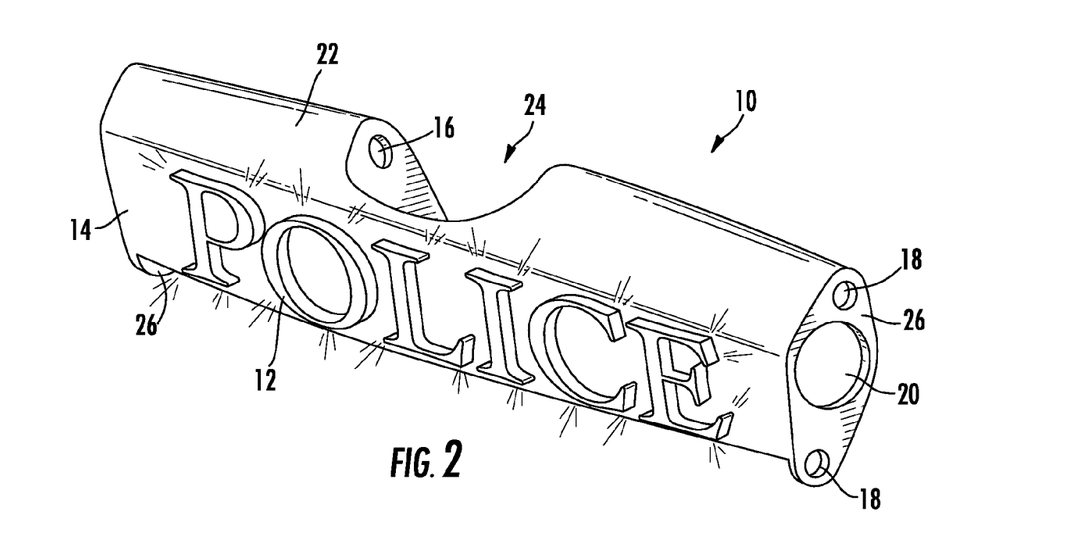
FIG. 2 is a front perspective view of a motorcycle safety and vanity light bar, illustrating, in particular, an illuminated identification and safety message with raised lettering.

Referring now to FIG. 2 a front perspective view of a motorcycle safety and vanity light bar 10 is shown. In addition to the depiction in FIG. 1, raised letters are shown on the transparent optical apertures 12. The raised letters provide additional visual indication and aesthetic improvements, in addition to the cut-out and the illumination. By way of example, the message shown in FIG. 1 in the plurality of transparent optical apertures 12 is an illuminated "POLICE" with raised letters to visually indicate to those within sight distance that the motorcycle is one of law enforcement. Raised letters can be fabricated, for example, from a transparent plastic lens material or the like. Such letters are useful in identification and aesthetically pleasing even when not illuminated from within the motorcycle safety and vanity light bar 10.

Figure 3:
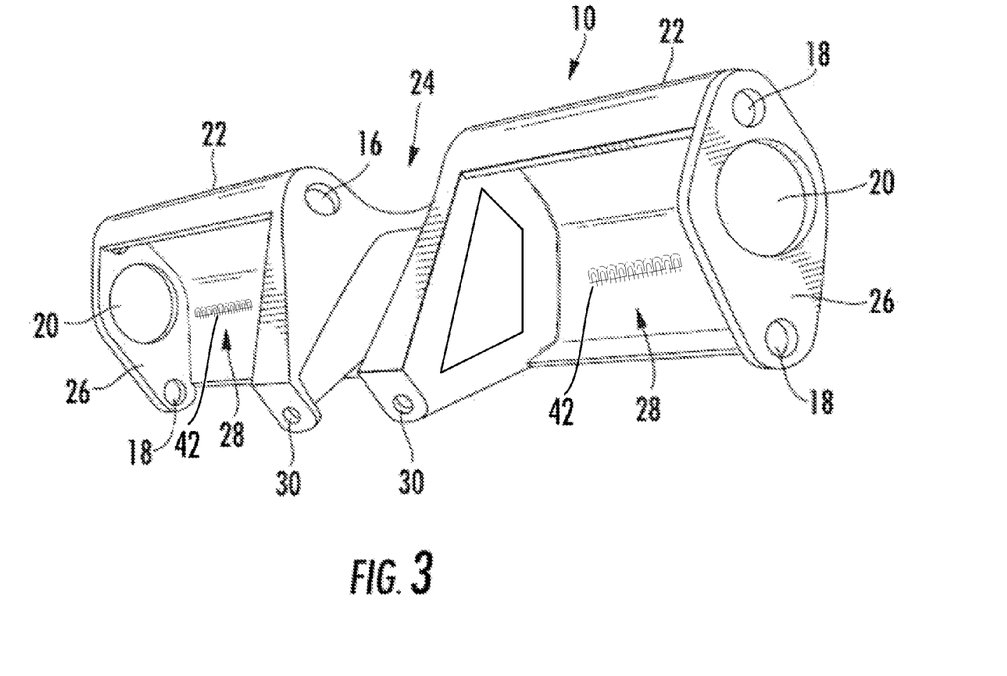
FIG. 3 is a rear perspective view of a motorcycle safety and vanity light bar, illustrating, in particular, areas for attachment and placement of lights and wires.

Referring now to FIG. 3 a rear perspective view of a motorcycle safety and vanity light bar 10 is shown. In addition to the elements shown and described in FIGS. 1 and 2, one or more rear mounting hole 30 is shown. Each mounting hole 30 can be utilized to secure the motorcycle safety and vanity light bar 10 to a rear fender or front frame of the motorcycle, for example. Additionally, area 28 is utilized for the placement of lamps 40 of the internal light source and associated wires and wiring harnesses (not shown). By way of example, a block of light-emitting diodes (LEDs) 42 is shown to illuminate through the transparent optical apertures 12 of the message surface area 14. Varied configurations of lamps, LEDs, and strobes can be utilized to illuminate the message surface area 14 from within the motorcycle safety and vanity light bar 10. Additionally, area 28 provides space for wires and wiring harnesses providing electrical connectivity to any lights attached to end connectivity points 26 or disposed within recess area 24.

Figure 4:
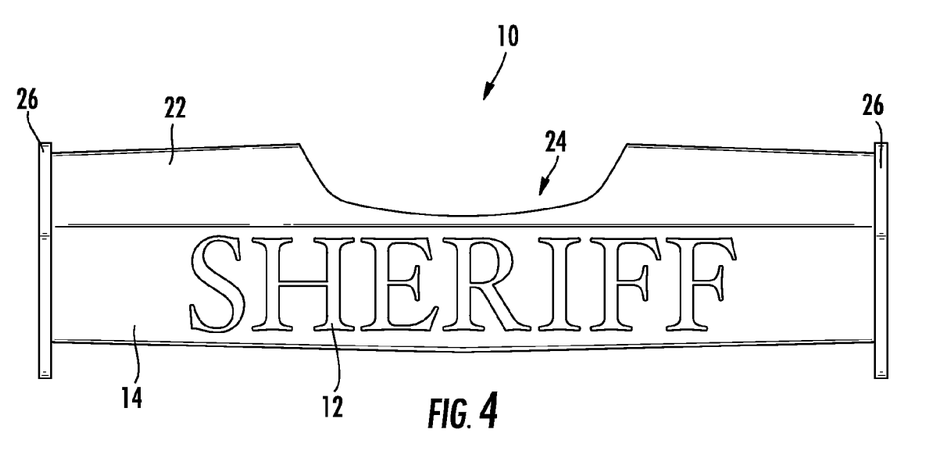
FIG. 4 is a front planar view of a motorcycle safety and vanity light bar.

Referring now to FIG. 4, a front planar view of a motorcycle safety and vanity light bar 10 is shown. The motorcycle safety and vanity light bar 10 includes a light bar having a top surface 22 and an outwardly facing message surface area 14 for illumination from an internal light source. Disposed upon the outwardly facing message surface area 14 of the light bar 10 is a plurality of transparent optical apertures 12 which can further include filters, colors, and raised letters and numbers, for example. The motorcycle safety and vanity light bar 10 includes end connectivity points 26 disposed upon each end for connectivity with other lights, such as turn signal directional lights, for example. Recess 24 of the motorcycle safety and vanity light bar 10 provides room for a rear tail light in a rear-mounted version and for a head light or the like in a front-mounted version.

Figure 5:
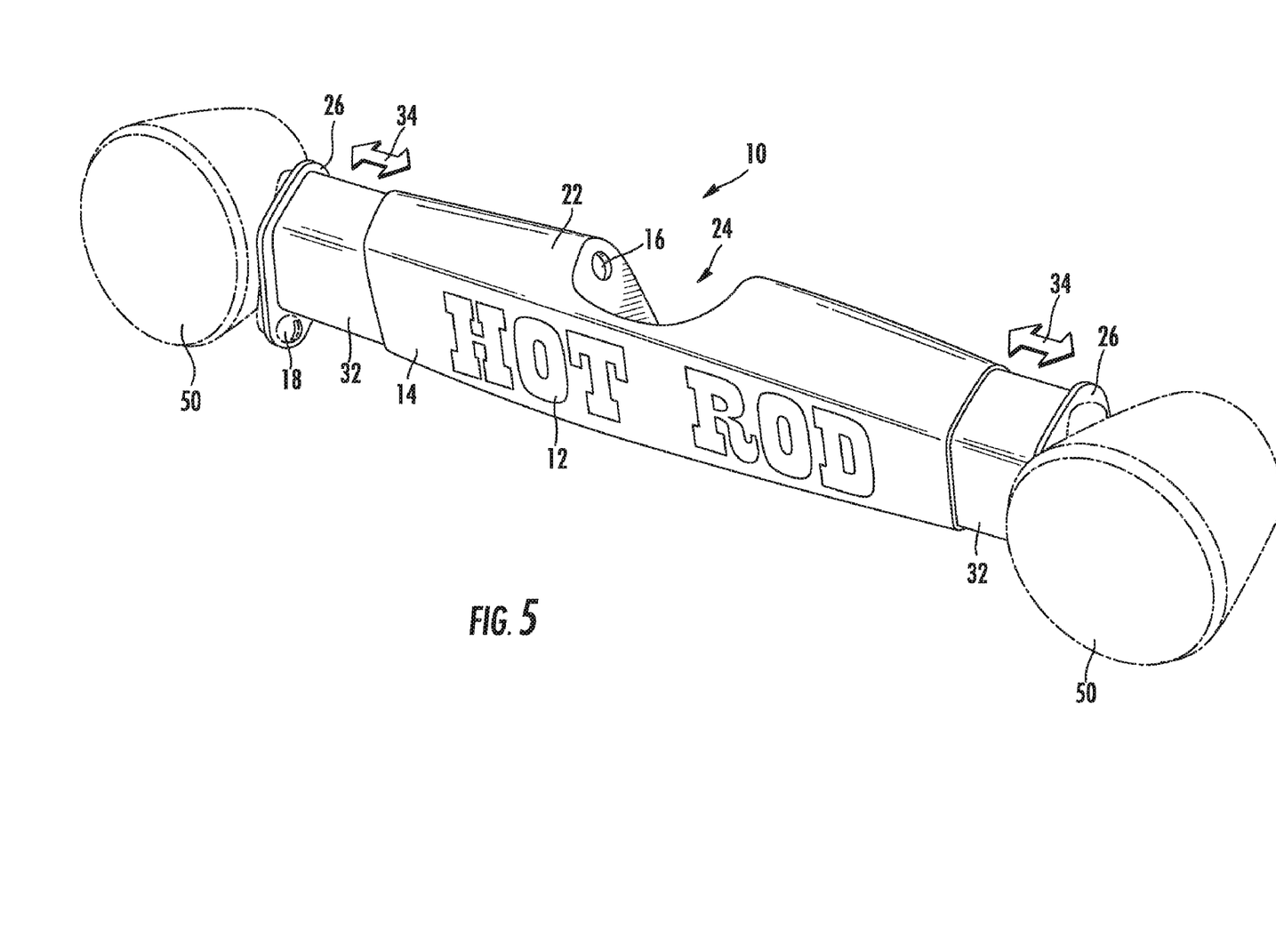
FIG. 5 is a front perspective view of a motorcycle safety and vanity light bar, illustrating, in particular, an illuminated vanity message and the extensibility of the light bar.

Referring now to FIG. 5, a front perspective view of a motorcycle safety and vanity light bar 10 is shown. In addition to the elements shown and described in the prior figures, light bar extensions 32 are shown. The light bar extensions 32 are slidably disposed within each end of the motorcycle safety and vanity light bar 10. The light bar extensions 32 can be fabricated from the same materials as the message surface area 14 and top surface 22, such as, for example, metal or a plastic lens material. The motorcycle safety and vanity light bar 10 is slidably extensible to extend its overall width in the direction of arrow 34. This extensibility adds to the size of the illumination path and message surface area. The motorcycle safety and vanity light bar 10 is shown with mounted signal lights 50, for example. By way of example, the message shown in FIG. 5 in the plurality of transparent optical apertures 12 is "HOT ROD" to visually indicate to those within sight distance that the motorcycle contains a vanity message.

Figure 6:
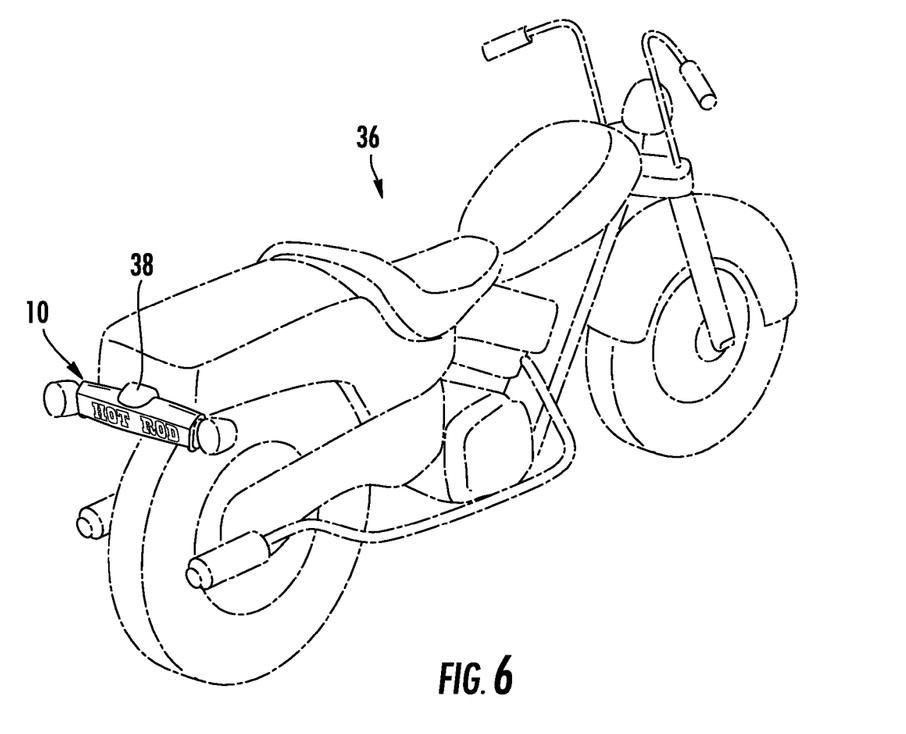
FIG. 6 is a rear perspective view of a motorcycle illustrating the configuration of the motorcycle safety and vanity light bar with the existing tail lights and brake lights of the motorcycle on the rear of the motorcycle.

Referring now to FIG. 6, a rear perspective view of a motorcycle 36 is shown. The motorcycle safety and vanity light bar 10 is shown on the rear of the motorcycle 36 disposed beneath a taillight 38. An illuminated vanity message is displayed and from the rear of the motorcycle.

Figure 7:
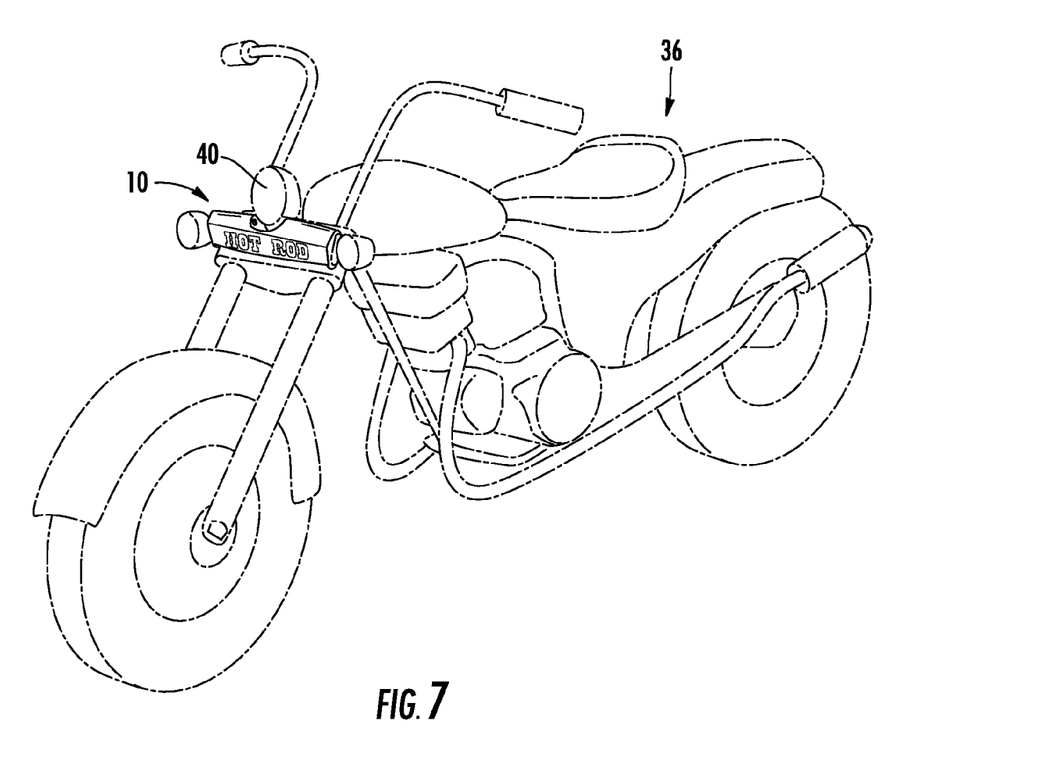
FIG. 7 is a front perspective view of a motorcycle illustrating the configuration of the motorcycle safety and vanity light bar with the head lights and signal lights on the front of the motorcycle.

Referring now to FIG. 7, a front perspective view of a motorcycle 36 is shown. The motorcycle safety and vanity light bar 10 is shown on the rear of the motorcycle 36 disposed beneath a headlight 40. An illuminated vanity message is displayed and from the front of the motorcycle.

In use the motorcycle safety and vanity light bar 10 provides added illumination to the motorcycle 36 and enhanced aesthetic appeal. Additionally, the motorcycle safety and vanity light bar 10 provides additional illumination after dark. A consumer can select from a pre-determined message or select a custom message to be cut into the motorcycle safety and vanity light bar 10. Additionally, color can be varied such that, for example, letters shown in the transparent optical apertures 12 can be of a different color than the message surface area 14. Furthermore, variations can include utilization of raised letters, numbers, and symbols as part of the message.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A safety and vanity light bar for a motorcycle, the safety and vanity light bar comprising:
   a light bar, configured to hold at least one motorcycle safety light selected from the group consisting of: a taillight, a directional light, and a headlight, having an outwardly facing message surface area for illumination from an internal light source; and
   a plurality of transparent optical apertures disposed upon the outwardly facing message surface area of the light bar;
   wherein a message is displayed upon the message surface area and illuminated with illumination from the internal light source through the plurality of transparent optical apertures.

2. The safety and vanity light bar of claim 1, wherein the message surface area, upon which the plurality of transparent optical apertures are disposed, comprises an opaque lens.

3. The safety and vanity light bar of claim 1, wherein the message surface area, upon which the plurality of transparent optical apertures are disposed, comprises a metal surface.

4. The safety and vanity light bar of claim 1, wherein the light bar is configured for placement with a tail light and directional lights on a rear of a motorcycle.

5. The safety and vanity light bar of claim 1, wherein the light bar is configured for placement with a head light on a front of a motorcycle.

6. The safety and vanity light bar of claim 1, wherein the plurality of transparent optical apertures disposed upon the outwardly facing message surface area of the light bar further comprises a raised insert lens disposed within the plurality of transparent optical apertures and defined by the shape of the plurality of transparent optical apertures.

7. The safety and vanity light bar of claim 1, wherein the plurality of transparent optical apertures disposed upon the outwardly facing message surface area of the light bar are apertures defined by characters.

8. The safety and vanity light bar of claim 1, wherein the plurality of transparent optical apertures disposed upon the outwardly facing message surface area of the light bar are apertures defined by numerals.

9. The safety and vanity light bar of claim 1, wherein the plurality of transparent optical apertures disposed upon the outwardly facing message surface area of the light bar comprise a message of public safety and identification.

10. The safety and vanity light bar of claim 1, wherein the plurality of transparent optical apertures disposed upon the outwardly facing message surface area of the light bar comprise a vanity message.

11. The safety and vanity light bar of claim 1, further comprising:
   a light bar extension slidably disposed within each end of the light bar;
   wherein the light bar is slidably extensible to extend an overall width of the light bar.

12. A lighting assembly for a motorcycle, the lighting assembly comprising:
   a light bar, configured to hold at least one motorcycle safety light selected from the group consisting of: a taillight, a directional light, and a headlight, having an outwardly facing message surface area for illumination from within;
   a plurality of transparent optical apertures disposed upon the outwardly facing message surface area of the light bar;
   a light source internal to the light bar configured to provide illumination through the plurality of transparent optical apertures disposed upon the light bar; and
   a wiring harness to provide electrical connectivity to the internal light source from a battery of a motorcycle;
   wherein a message is displayed upon the message surface area and illuminated with illumination from the light source through the plurality of transparent optical apertures.

13. The lighting assembly for a motorcycle of claim 12, wherein the light source internal to the light bar comprises a lamp.

14. The lighting assembly for a motorcycle of claim 12, wherein the light source internal to the light bar comprises a plurality of light-emitting diodes (LEDs).

15. The lighting assembly for a motorcycle of claim 12, wherein the light source internal to the light bar comprises a strobe lamp.

16. The lighting assembly for a motorcycle of claim 12, wherein the wiring harness and the light source are concealed within the light bar.

17. The lighting assembly for a motorcycle of claim 12, further comprising:
   a light bar extension slidably disposed within each end of the light bar;
   wherein the light bar is slidably extensible to extend an overall width of the light bar.

18. A motorcycle comprising:
   a motorcycle frame having a rear and a front;
   a light bar, configured to hold at least one motorcycle safety light selected from the group consisting of: a taillight, a directional light, and a headlight, disposed upon the motorcycle frame, the light bar having an outwardly facing message surface area for illumination from an internal light source; and
   a plurality of transparent optical apertures disposed upon the outwardly facing message surface area of the light bar;
   wherein a message is displayed upon the message surface area and illuminated with illumination from the internal light source through the plurality of transparent optical apertures.

19. The motorcycle of claim 18, wherein the message is displayed on the rear of the motorcycle.

20. The motorcycle of claim 18, wherein the message is displayed on the front of the motorcycle.

* * * * *